United States Patent
Chang et al.

[11] Patent Number: 5,870,210
[45] Date of Patent: Feb. 9, 1999

[54] FEED ROLLER ASSEMBLY OF A FAX MACHINE

[76] Inventors: Shyi-Huang Chang, 2f, No. 8, Alley 6, Lane 118, Sec. 2, Ho Ping E. Rd., Taipei; Jaw-Kuen Jean, 5F, No. 8, Alley 2 Lane 20, Chi-Tou Rd., Tu Cheng, Taipei Hsien; Po-Han Lin, 8F-1, No. 187, Chu-Kuang Rd., Chungko City, all of Taiwan

[21] Appl. No.: 796,417

[22] Filed: Feb. 6, 1997

[51] Int. Cl.⁶ ....................................... H04N 1/04
[52] U.S. Cl. .................. 358/498; 358/496; 271/109
[58] Field of Search .................. 358/498, 496, 358/401, 474, 471, 505, 501; 271/109, 4.1, 4.01, 3.14, 121, 125, 10.11, 10.12, 4.08; 399/23, 261, 367

[56] References Cited

U.S. PATENT DOCUMENTS

| | | | |
|---|---|---|---|
| 5,295,002 | 3/1994 | Ishii | 358/498 |
| 5,517,332 | 5/1996 | Barry et al. | 358/498 |
| 5,553,842 | 9/1996 | Wilcox et al. | 358/498 |
| 5,579,128 | 11/1996 | Cheng | 358/496 |
| 5,579,129 | 11/1996 | Iwata et al. | 358/498 |

*Primary Examiner*—Edward L. Coles
*Assistant Examiner*—Cheukfan Lee

[57] ABSTRACT

A feed roller assembly including an axle, a feed roller fixedly mounted around the axle and turned with it to feed a sheet of paper forward, an end cap fixedly mounted on one end of the axle and having a projecting rod raised from an inner side, the projecting rod having a bevel face, and a transmission gear turned about one end of the axle adjacent to the end cap, the transmission gear having a springy projecting rod raised from one end and moved to act against the projecting rod of the end cap, causing the end cap and the axle to be turned with the transmission gear, the springy projecting rod of the transmission gear passing over the bevel face of the projecting rod of the end cap when the roller is pulled by a transmission roller, which delivers the fed sheet of paper forwards, to turn the axle and the end cap at a higher speed than the transmission gear, permitting the end cap and the axle to be turned relative to the transmission gear.

1 Claim, 8 Drawing Sheets

FEED ROLLER ASSEMBLY OF A FAX MACHINE

BACKGROUND OF THE INVENTION

The present invention relates to a feed roller assembly for a fax machine, and more particularly to such a feed roller assembly which permits the fed sheet of paper to be smoothly carried forwards by the transmission roller of the fax machine.

A fax machine comprises a feed roller driven to feed sheets of paper individually, and a transmission roller driven to deliver fed sheet of paper at a higher speed. Because the feed roller and the transmission roller are separately turned at different speeds, the fed sheet of paper may easily be jammed between the feed roller and the transmission roller. There is known a feed roller assembly equipped with a one-way coupling element and designed to eliminate the aforesaid problem. The one-way coupling element is fixedly mounted on the axle of the roller assembly and having a raised portion. The transmission gear of the feed roller assembly has a raised portion normally stopped at the raised portion of the coupling element. When the feed roller of the feed roller assembly is pulled by the transmission roller, the raised portion of the coupling element is disconnected from the raised portion of the transmission gear to eliminate the formation of a reverse active force. This structure of feed roller assembly is still not satisfactory in function. When a long sheet of paper is fed, the function of the one-way coupling element cannot be fully carried out, and the fed sheet of paper may be jammed in the fax machine, or delivered forwards at an uneven speed.

SUMMARY OF THE INVENTION

The present invention has been accomplished to provide a feed roller assembly for a fax machine which eliminates the aforesaid problems. According to the present invention, the feed roller assembly comprises an axle, a feed roller fixedly mounted around the axle and turned with it to feed a sheet of paper forward, permitting it to be delivered forwards by a transmission roller of the fax machine, an end cap fixedly mounted on one end of the axle and having a projecting rod raised from an inner side, the projecting rod having a bevel face, and a transmission gear turned about one end of the axle adjacent to the end cap, the transmission gear having a springy projecting rod raised from one end and moved to act against the projecting rod of the end cap, causing the end cap and the axle to be turned with the transmission gear, the springy projecting rod of the transmission gear passing over the bevel face of the projecting rod of the end cap when the roller is pulled by the transmission roller to turn the axle and the end cap at a higher speed than the transmission gear, permitting the end cap and the axle to be turned relative to the transmission gear.

DETAILED DESCRIPTION OF THE PREFERRED EMBODIMENT

Figure 1:
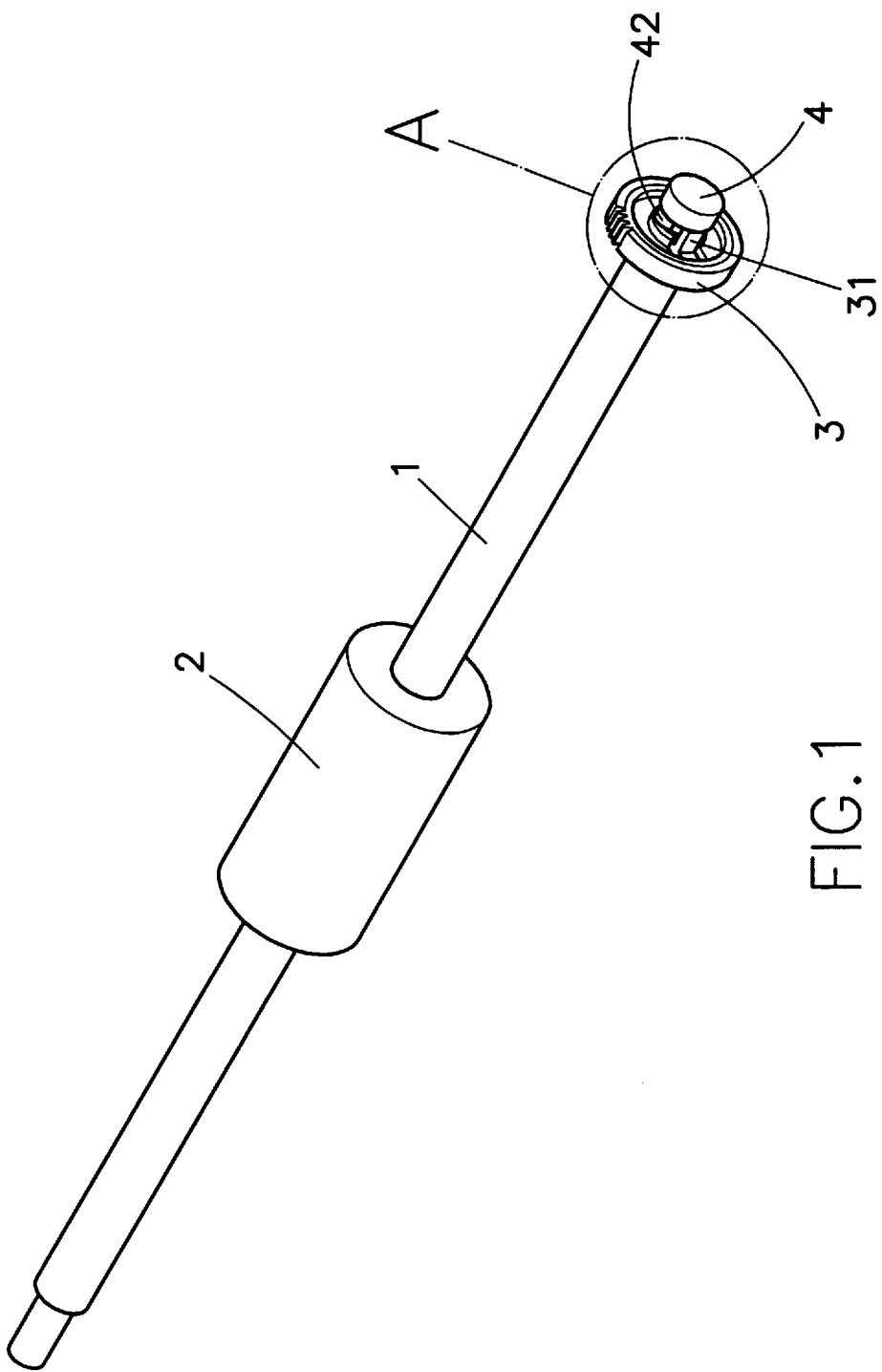
FIG. 1 is an elevational view of a feed roller assembly according to the present invention.
Figure 1A:
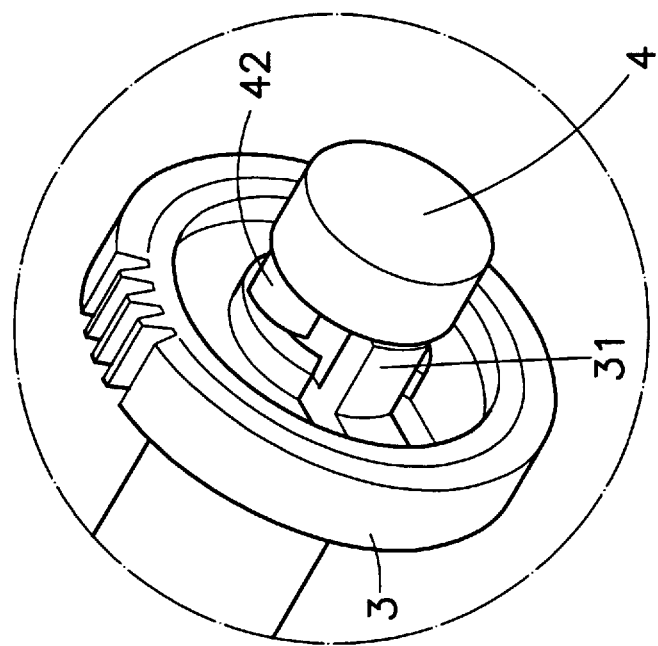
FIG. 1A is an enlarged view of a part of FIG. 1, showing the relationship between the transmission gear and the end cap.
Figure 2:
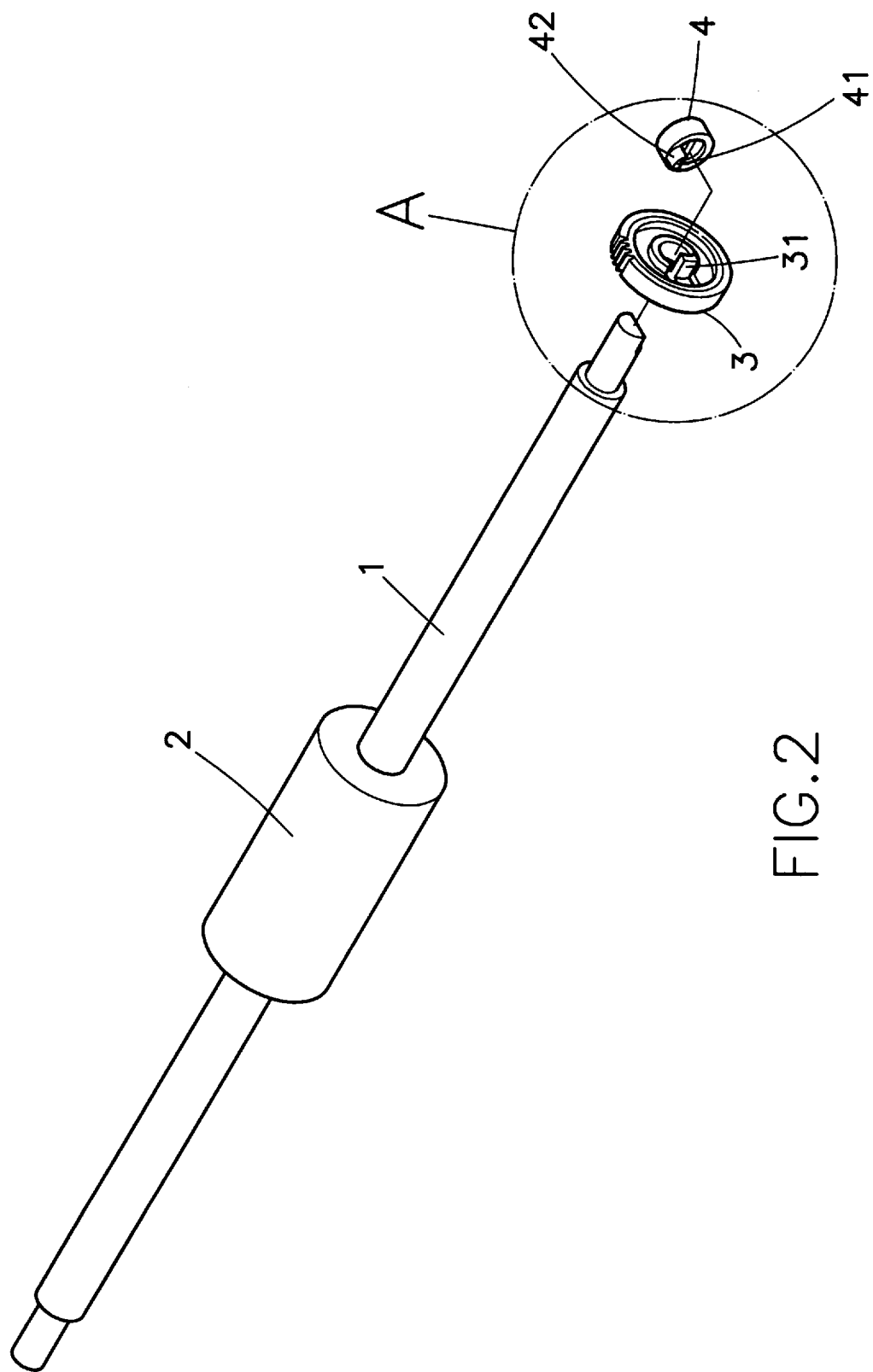
FIG. 2 is an exploded view of the feed roller assembly shown in FIG. 1.
Figure 2A:
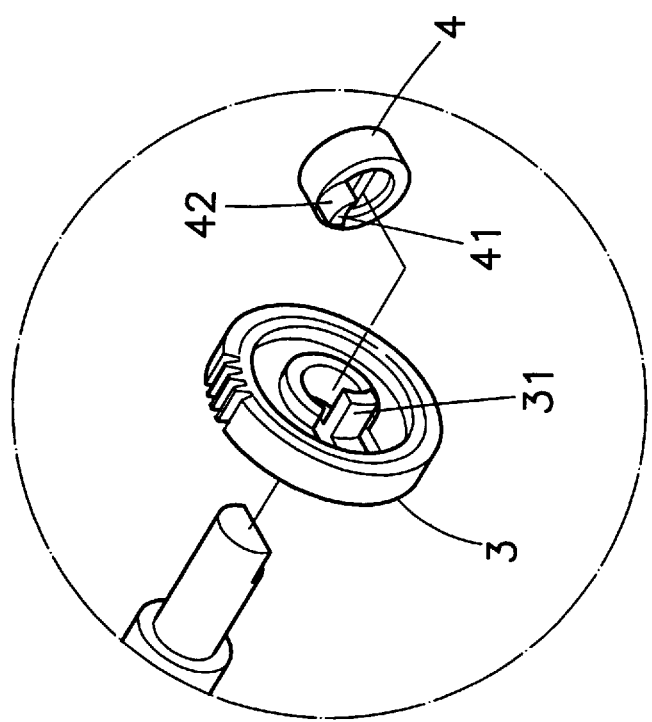
FIG. 2A is an enlarged view of a part of FIG. 1, showing the detailed structure of the transmission gear and the end cap.

Referring to FIGS. 1, 1A, 2 and 2A, a feed roller assembly in accordance with the present invention is generally comprised of an axle 1, a feed roller 2 fixedly mounted around the axle 1 in the middle, an end cap 4 fixedly mounted on one end of the axle 1, and a transmission gear 3 turned about the axle 1 near one end adjacent to the end cap 4. The transmission gear 3 has a springy projecting rod 31 raised from one side and facing the end cap 4. The end cap 4 has a projecting rod 41 raised from one end adapted for acting against the springy projecting rod 31 of the transmission gear 3. The projecting rod 41 has a bevel face 42.

Figure 3:
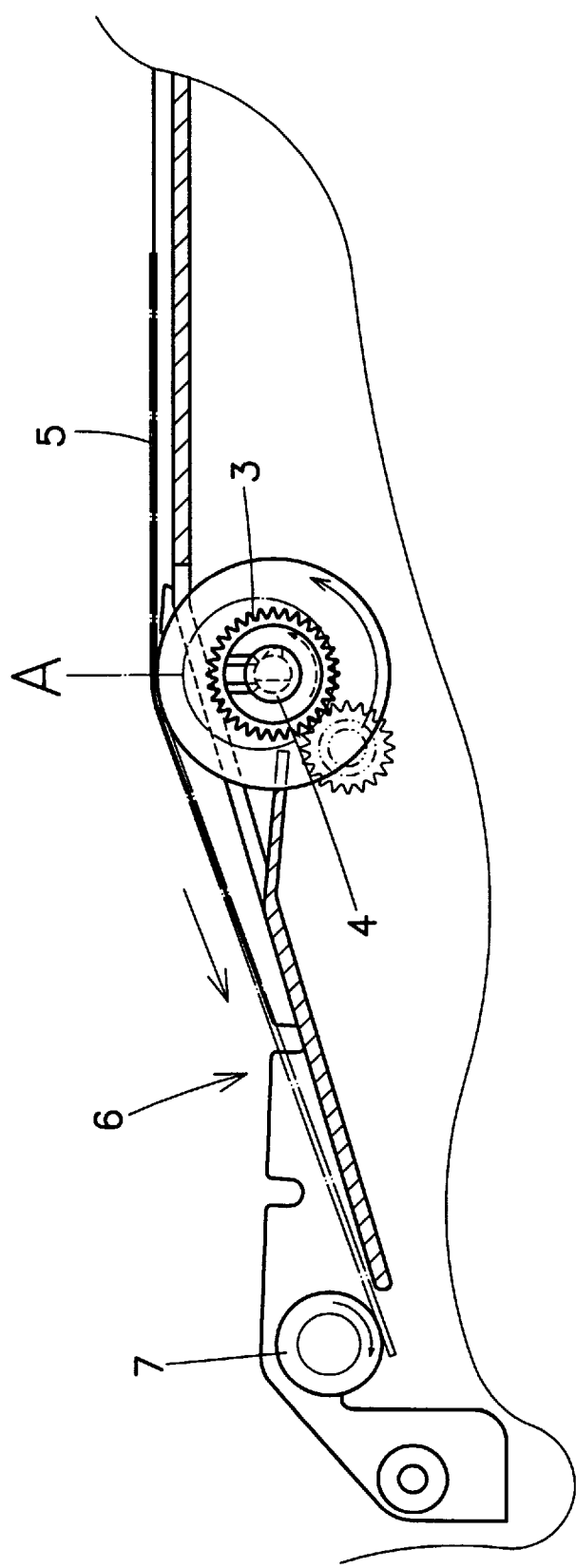
FIG. 3 is an applied view of the present invention, showing the feed roller assembly installed in the fax machine and operated.
Figure 3A:
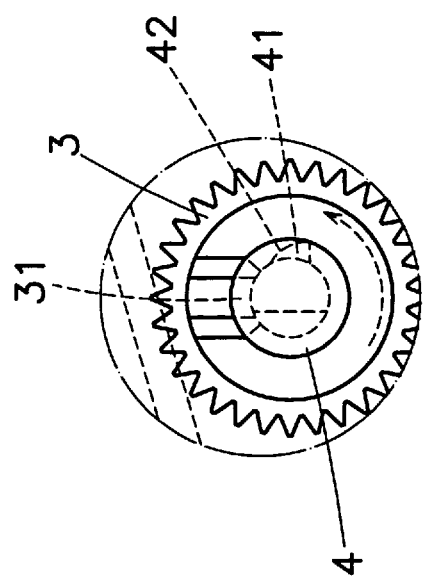
FIG. 3A is an enlarged view of a part of FIG. 3, showing the springy projecting rod of the transmission gear moved away from the projecting rod of the end cap.
Figure 4:
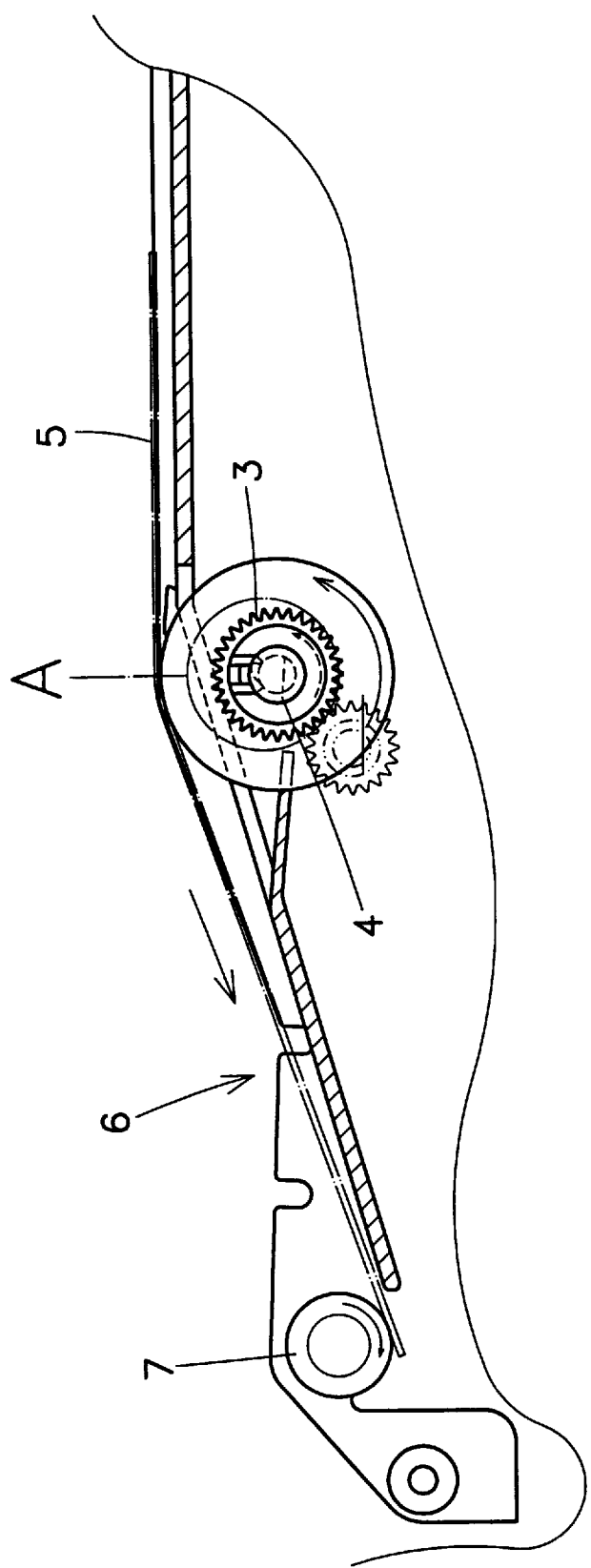
FIG. 4 is similar to FIG. 3 but showing the springy projecting rod of the transmission gear moved over the bevel face of the projecting rod of the end cap.
Figure 4A:
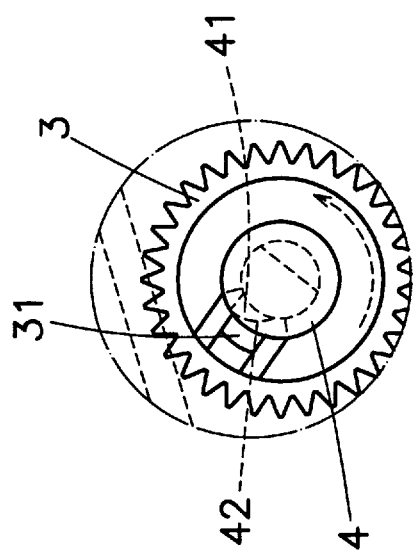
FIG. 4A is an enlarged view of a part of FIG. 4.

Referring to FIGS. 3 and 4, when a sheet of paper 5 is inserted into the fax machine 6 and the feed sensor of the fax machine 6 is triggered, the motor (not shown) is driven to turn the transmission gear 3 forwards. When the transmission gear 3 is turned forwards, the springy projecting rod 31 is moved to the projecting rod 41 of the end cap 4, and forced to move the end cap 4, thereby causing the end cap 4 and the axle 1 to be turned with the transmission gear 3. When the axle 1 is turned forwards, the feed roller 2 is synchronously turned to move the fed sheet of paper forwards to the transmission roller 7. When the fed sheet of paper is carried forwards by the transmission roller 7, the feed roller 2 is pulled to rotate at a speed higher than the transmission gear 3, thereby causing a speed difference between the feed roller 2 (the axle 1) and the transmission gear 3. However, because the springy projecting rod 31 is acted against the projecting rod 41, reverse active force is eliminated when the feed roller 2 is pulled by the forwarding sheet of paper. When a long sheet of paper is delivered, the springy projecting rod 31 of the transmission gear 3 will be forced to move over the projecting rod 41 of the end cap 4 along the bevel face 42, for permitting the sheet of paper to be smoothly carried forwards by the transmission roller 7.

While only one embodiment of the present invention has been shown and described, it will be understood that various modifications and changes could be made thereunto without departing from the spirit and scope of the invention disclosed.

What the invention claimed is:

1. A feed roller assembly of a fax machine, comprising an axle, a feed roller fixedly mounted around said axle and turned with it to feed a sheet of paper forward, permitting said sheet of paper to be delivered forwards by a transmission roller of the fax machine, an end cap fixedly mounted on one end of said axle and having a projecting rod raised from an inner side, said projecting rod having a bevel face, and a transmission gear turned about one end of said axle adjacent to said end cap, said transmission gear having a springy projecting rod raised from one end and moved to act against the projecting rod of said end cap, causing said end cap and said axle to be turned with said transmission gear, the springy projecting rod of said transmission gear passing over the bevel face of the projecting rod of said end cap when said roller is pulled by said transmission roller to turn said axle and said end cap at a higher speed than said transmission gear, permitting said end cap and said axle to be turned relative to said transmission gear.

* * * * *